(12) United States Patent
Leuthold et al.

(10) Patent No.: US 9,790,990 B2
(45) Date of Patent: Oct. 17, 2017

(54) BEARING GAP DETERMINED DEPTH AND WIDTH

(71) Applicant: Seagate Technology LLC, Cupertino, CA (US)

(72) Inventors: Hans Leuthold, Santa Cruz, CA (US); Paco G. Flores, Felton, CA (US); Chris Woldemar, Santa Cruz, CA (US)

(73) Assignee: Seagate Technology LLC, Cupertino, CA (US)

( * ) Notice: Subject to any disclaimer, the term of this patent is extended or adjusted under 35 U.S.C. 154(b) by 59 days.

(21) Appl. No.: 13/919,667

(22) Filed: Jun. 17, 2013

(65) Prior Publication Data

US 2014/0369631 A1 Dec. 18, 2014

(51) Int. Cl.
*F16C 33/10* (2006.01)
*F16C 17/10* (2006.01)

(52) U.S. Cl.
CPC .......... *F16C 33/107* (2013.01); *F16C 17/107* (2013.01); *F16C 2370/12* (2013.01)

(58) Field of Classification Search
CPC .. F16C 17/107; F16C 32/0659; F16C 33/107; F16C 2370/12
USPC .................................. 384/100–124
See application file for complete search history.

(56) References Cited

U.S. PATENT DOCUMENTS

| | | | |
|---|---|---|---|
| 5,664,889 A * | 9/1997 | Gustafson | F16C 17/22 384/100 |
| 6,350,059 B1 * | 2/2002 | Takahashi | 384/123 |
| 6,505,970 B2 * | 1/2003 | Takahashi et al. | 384/123 |
| 6,702,408 B1 * | 3/2004 | Nagarathnam | F16C 17/107 384/112 |
| 6,939,047 B2 * | 9/2005 | Gomyo et al. | 384/107 |
| 7,133,250 B2 | 11/2006 | Herndon et al. | |
| 7,135,797 B2 | 11/2006 | Khan et al. | |
| 7,144,482 B2 | 12/2006 | Steele et al. | |
| 7,224,552 B2 | 5/2007 | Herndon et al. | |
| 7,407,327 B2 | 8/2008 | Le et al. | |
| 7,441,957 B2 * | 10/2008 | Hong | F16C 33/107 384/100 |
| 7,578,621 B2 * | 8/2009 | Nishimura et al. | 384/107 |
| 7,946,770 B2 * | 5/2011 | Hayashi et al. | 384/123 |
| 8,157,447 B2 | 4/2012 | Aiello | |
| 8,192,087 B2 | 6/2012 | Hipwell et al. | |
| 8,300,355 B2 * | 10/2012 | Yang | 360/99.08 |
| 8,337,086 B2 * | 12/2012 | Oe et al. | 384/100 |
| 8,379,345 B2 * | 2/2013 | Mizukami et al. | 360/99.08 |

(Continued)

OTHER PUBLICATIONS

International Preliminary Report on Patentability; for PCT Application No. PCT/US2014/042707 issued Dec. 22, 2015, pp. 1-11.

*Primary Examiner* — Alan B Waits

(57) ABSTRACT

Provided herein, is an apparatus that includes a fluid dynamic bearing defined in a gap between a stationary component and a rotatable component. The fluid dynamic bearing includes a first portion of the gap at an axial end of the fluid dynamic bearing, and a second portion of the gap. The first portion of the gap is narrower than the second portion of the gap. A groove in the fluid dynamic bearing on the stationary component or the rotatable component includes a portion of a predetermined width or a predetermined depth. The portion of the predetermined width or predetermined depth is selected based on the first gap or the second gap.

6 Claims, 7 Drawing Sheets

(56) References Cited

U.S. PATENT DOCUMENTS

| | | | |
|---|---|---|---|
| 2001/0005436 A1* | 6/2001 | Sjostrom et al. | 384/123 |
| 2004/0027018 A1 | 2/2004 | LaBlance et al. | |
| 2006/0039636 A1* | 2/2006 | Ichiyama | 384/107 |
| 2006/0051001 A1* | 3/2006 | Nishimura et al. | 384/100 |
| 2006/0222276 A1* | 10/2006 | Uenosono | 384/107 |
| 2007/0258670 A1* | 11/2007 | Akahori | 384/112 |
| 2008/0037916 A1* | 2/2008 | Hayashi et al. | 384/107 |
| 2008/0056104 A1* | 3/2008 | Nishimura et al. | 369/269 |
| 2008/0205805 A1* | 8/2008 | Bauer | 384/123 |
| 2010/0226601 A1* | 9/2010 | Inazuka et al. | 384/107 |
| 2011/0026163 A1* | 2/2011 | Komori et al. | 360/234.1 |
| 2011/0033144 A1* | 2/2011 | Kodama | F16C 17/026 384/112 |
| 2012/0091842 A1* | 4/2012 | Kim et al. | 310/90 |
| 2013/0181558 A1* | 7/2013 | Kodama | H02K 5/1675 310/90 |

\* cited by examiner

BEARING GAP DETERMINED DEPTH AND WIDTH

BACKGROUND

Alignment of read/write heads with the storage tracks in disk drive memory systems allows disks to be designed with greater track densities, thereby allowing smaller disks and/or increasing the storage capacity of the disks. Spindle motors having fluid dynamic bearings situated between, for example, a shaft and sleeve support a hub and disk for rotation, thereby assisting rotational accuracy. In fluid dynamic bearings, also referred to as hydrodynamic bearings, a lubricating fluid may be provided between a fixed member bearing surface and a rotating member bearing surface of the disk drive. Disk drive hydrodynamic bearings are sensitive, for example, to external loads and mechanical shock. As a result, the stiffness of the fluid dynamic bearing affects the support of a rotating load on the spindle during wobble or tilt.

SUMMARY

Provided herein, is an apparatus that includes a fluid dynamic bearing defined in a gap between a stationary component and a rotatable component. The fluid dynamic bearing includes a first portion of the gap at an axial end of the fluid dynamic bearing, and a second portion of the gap. The first portion of the gap is narrower than the second portion of the gap. A groove in the fluid dynamic bearing on the stationary component or the rotatable component includes a portion of a predetermined width or a predetermined depth. The portion of the predetermined width or predetermined depth is selected based on the first gap or the second gap.

These and other features, aspects, and embodiments may be better understood with reference to the following drawings, description, and appended claims.

DRAWINGS

Various embodiments are illustrated by way of example, and not by way of limitation, in the figures of the accompanying drawings and in which like reference numerals refer to similar elements.

DESCRIPTION

Figure 1:
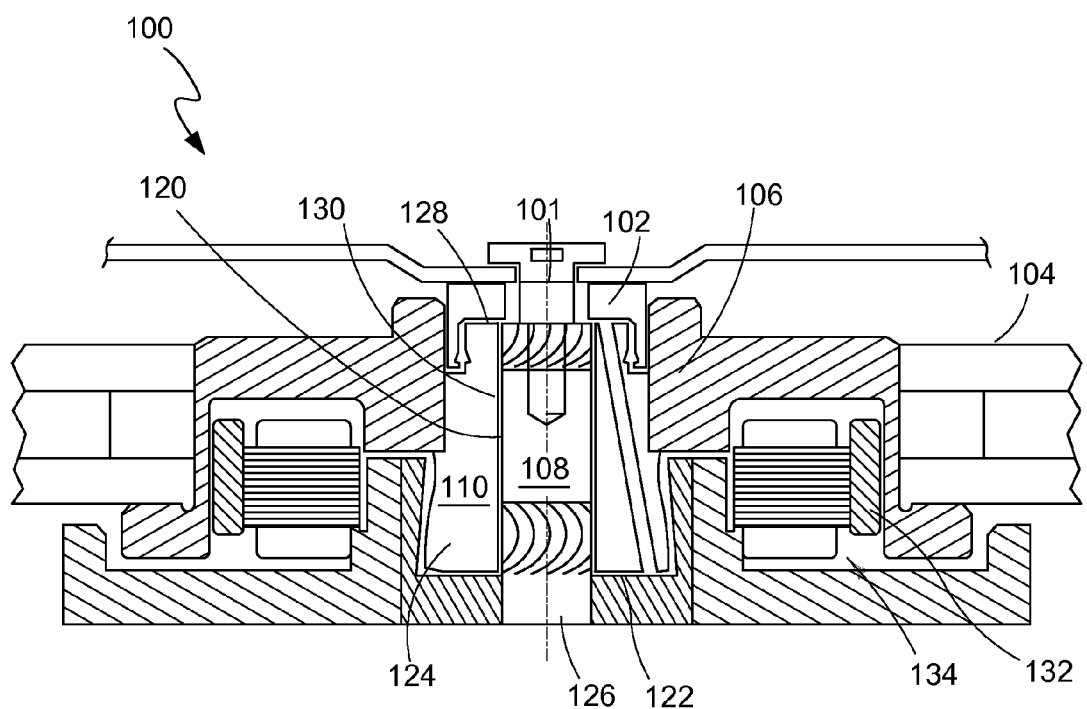
FIG. 1 illustrates a cross-sectional view of a fluid dynamic bearing motor, according to one aspect of the present embodiments.

Before various embodiments are described in greater detail, it should be understood that the embodiments are not limited to the particular embodiments described and/or illustrated herein, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

An apparatus is described herein for application to a fluid dynamic bearing motor. A fluid dynamic bearing is defined between a stationary component and a rotatable component. The fluid dynamic bearing may be, for example, a journal, thrust, conical, and/or limiter bearing. According to one embodiment, the rotatable and stationary components may be designed such that one portion of the bearing is optimized for large angular or translational movement and another portion is optimized for steady state operation. By increasing the angular and in-line stiffness of the bearing where bearing contact is likely to occur, external forces, such as translational or gyroscopic loads, are compensated for thereby providing a more stable operating environment for a disk during rotation of a spindle motor and for a reduction in bearing wear. For example, a device, containing the embodiments described herein, may experience a shock event (i.e., dropping or tilting) causing the entire rotating portion to be angularly displaced relative to the stationary portion. Embodiments described herein affect the robustness of the bearing, thereby accurately and stably supporting the rotating load on the spindle without wobble or tilt.

According to an embodiment, a series of individual grooves may be formed, within the fluid dynamic bearing, on the rotatable component and/or the stationary component to generate pressure to compensate for the aforementioned external loads and also restricting angular and axial motions of the bearing. These series of individual grooves may be shaped in such a way to exhibit differing behavioral characteristics based on their axial and radial locations. Furthermore, these series of grooves may have varying groove depths or widths relative to the groove positioning along a centerline axis of the rotatable and/or stationary components. According to an embodiment, to achieve a higher, for example, angular stiffness and in-line stiffness, groove depth and/or groove width in combination with groove location is optimized to yield the most effective angular and in-line stiffness.

In one embodiment, for example, as a local radial gap narrows or tightens, during relative rotation between the stationary and rotatable components, the groove depth may become shallower and/or the groove width may become narrower to reach an optimal, more resistant bearing, which may provide a more stable system by reducing movement during rotation or a shock event. Varying groove depth in response to the local radial gap overcomes a tradeoff between angular stiffness and in-line stiffness in systems including consistent depth groove profiles. According to the features discussed below, a higher in-line stiffness and a higher angular stiffness may be achieved by varying groove depths or widths as a function of the local radial gap wherein the groove depth, width and radial gap are both optimized relative to a predetermined in-line and angular stiffness.

The various embodiments will now be described in greater detail.

FIG. 1 provides a cross-sectional view of a fluid dynamic bearing motor 100 with a varying gap 130 formed between a rotatable component 124 and a stationary component 126, wherein data storage disks 104 may be rotated at high speeds during operation using magnets 132 and a stator 134 in accordance with one embodiment. The rotatable component 124 may include a hub portion 106 and a sleeve portion 110 while the stationary component 126 may include a shaft 108 and a limiter 102 in this embodiment. In another embodiment, the sleeve portion 110 may be stationary, and the hub portion 106 and the shaft 108 may be coupled together to rotate together about a centerline axis 101 (see for example FIGS. 3 and 6A and 6B).

The interface between, for example, the hub portion 106 and the shaft 108 and/or the interface between the sleeve portion 110 and shaft 108 coupled to a thrust cup (not shown) may define a fluid dynamic bearing. The fluid dynamic bearing may be, for example, a thrust bearing 122, a journal bearing 120, a limiter bearing 128, and/or a conical bearing (see for example FIG. 5). In some embodiments, the gap 130 may have different widths at a number of different positions between the stationary 126 and rotatable 124 components. The gap widths may be predetermined, and variable, to provide for an optimal performance by narrowing or widening the distance between the stationary 126 and rotatable 124 components. For example, (as described in FIG. 3) the gap 130 may be narrower at a first position or wider at a second position between the stationary 126 and rotatable 124 components. Therefore, by varying gap widths, as illustrated by the first and second positions, one may build in gap control changes that, for example, allow overall system stability in steady state operation and improvement in angular and in-line stiffness of a bearing during a shock event.

Figure 2A:
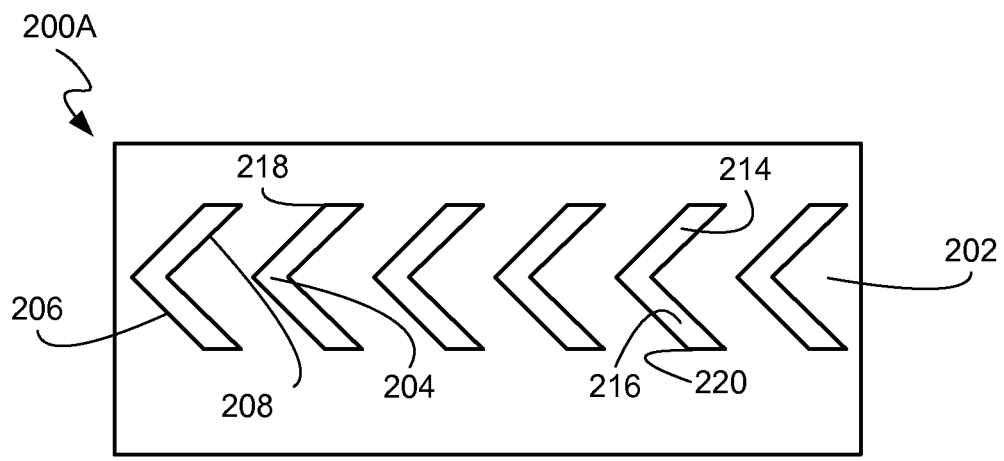
FIG. 2A illustrates a journal bearing sleeve or shaft, unrolled to provide a two-dimensional view of the grooves thereon, according to one aspect of the present embodiments.
Figure 2B:
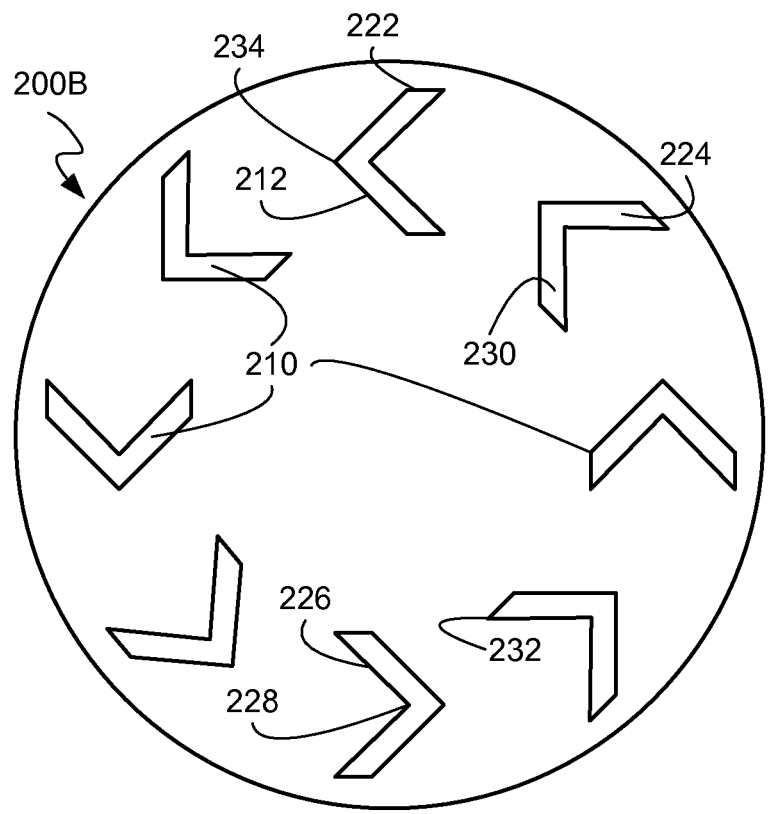
FIG. 2B illustrates a two-dimensional view of a thrust surface of a thrust bearing with grooves thereon, according to one aspect of the present embodiments.

According to an embodiment, a number of grooves (as seen in FIGS. 2A, 2B) may have a predetermined groove depth or groove width as a function of the gap 130. By varying the groove depth as a function of the gap 130, angular and in-line stiffness may be controlled in the bearing (120,122). The pressure-generating grooves may, for example, induce fluid flow in the interfacial regions, or gap 130 thereby generating a localized region of dynamic high pressure and stiffness during rotation of the rotatable components 124. For example, during a shock event, when external forces are applied to the fluid dynamic bearing motor 100, the gap 130 may become narrower or close down at various locations between the stationary 126 and rotatable 124 components. Therefore, differing groove parameters may be set wherein the groove depth is shallower or the groove width is narrower. By differing the groove profiles relative to a particular position along the rotatable 124 and/or stationary 126 components, groove variability as a function of the local radial gap allow tuning of angular and in-line stiffness of the bearing thereby improving overall performance of the fluid dynamic bearing motor 100.

It should be understood, especially in view of the additional details below, that the pressure-generating grooves may include asymmetric grooves and/or symmetric grooves. The asymmetric grooves and/or the symmetric grooves, in addition to chevron-shaped grooves provided herein below, may have additional pattern elements including, for example, herringbone and/or sinusoidal pattern elements.

FIG. 2A provides a journal bearing sleeve or shaft, unrolled to provide a two-dimensional view of the grooves thereon. According to an embodiment, groove profiles may vary relative to the local radial gap between the stationary 126 and rotatable 124 components. For instance, a groove profile may have a predetermined depth or a predetermined width as a function of the distance between the stationary 126 and rotatable 124 components. This allows tuning of the stiffness by varying groove profiles, for example, to increase angular and in-line stiffness within the bearing. As shown, unrolled sleeve or shaft 200A may comprise a single journal bearing 202, with grooves 204 thereon. Each of grooves 204 comprises an outside wall 206 and in inside wall 208. Each of grooves 204 also comprises a first segment 214 extending to a first terminus 218, wherein the first segment 214 and/or the first terminus 218 may be oriented toward an end of the bearing (e.g., top/bottom of a journal bearing). Each of grooves 204 also comprises a second segment 216 extending to a second terminus 220, wherein the second segment 216 and/or the second terminus 220 may be oriented toward a center/middle of the bearing (e.g., center/middle of a journal bearing).

Likewise, FIG. 2B provides a two-dimensional view of a thrust surface of a thrust bearing with grooves thereon, which thrust bearing, may represent either a top or bottom thrust bearing according to some embodiments. The grooves associated with the thrust bearing may have varying profiles relative to an outer and inner diameter wherein the groove profiles may be shallower or narrower nearer the outer diameter and deeper or wider nearer the inner diameter of the thrust bearing. As shown, thrust surface 200B, may have grooves 210 thereon. Each of grooves 210 comprises an outside wall 212 and an inside wall 226. Each of grooves 210 also comprises a first segment 224 extending to a first terminus 222, wherein the first segment 224 and/or the first terminus 222 may be oriented toward an end of the bearing. Each of grooves 210 also comprises a second segment 230 extending from vertices 234 and 228 to a second terminus 232, wherein the second segment 230 and/or the second terminus 232 may be oriented toward a center/middle of the bearing.

It should be understood that, while FIG. 2A illustrates a sleeve or a shaft with grooves thereon, embodiments are not limited to one of the sleeve or the shaft. For example, according to some embodiments both of the sleeve and the shaft may have grooves thereon, matched to provide a pressure-generating system optimized for normal and aberrant function. It should be further understood that, while FIG. 2B illustrates a thrust surface with grooves thereon, embodiments are not limited to one of the thrust surface or the opposing surface. For example, according to some embodiments both of the thrust surface and the opposing surface may have grooves thereon, matched to provide a pressure-generating system optimized for normal and aberrant function.

Figure 3:
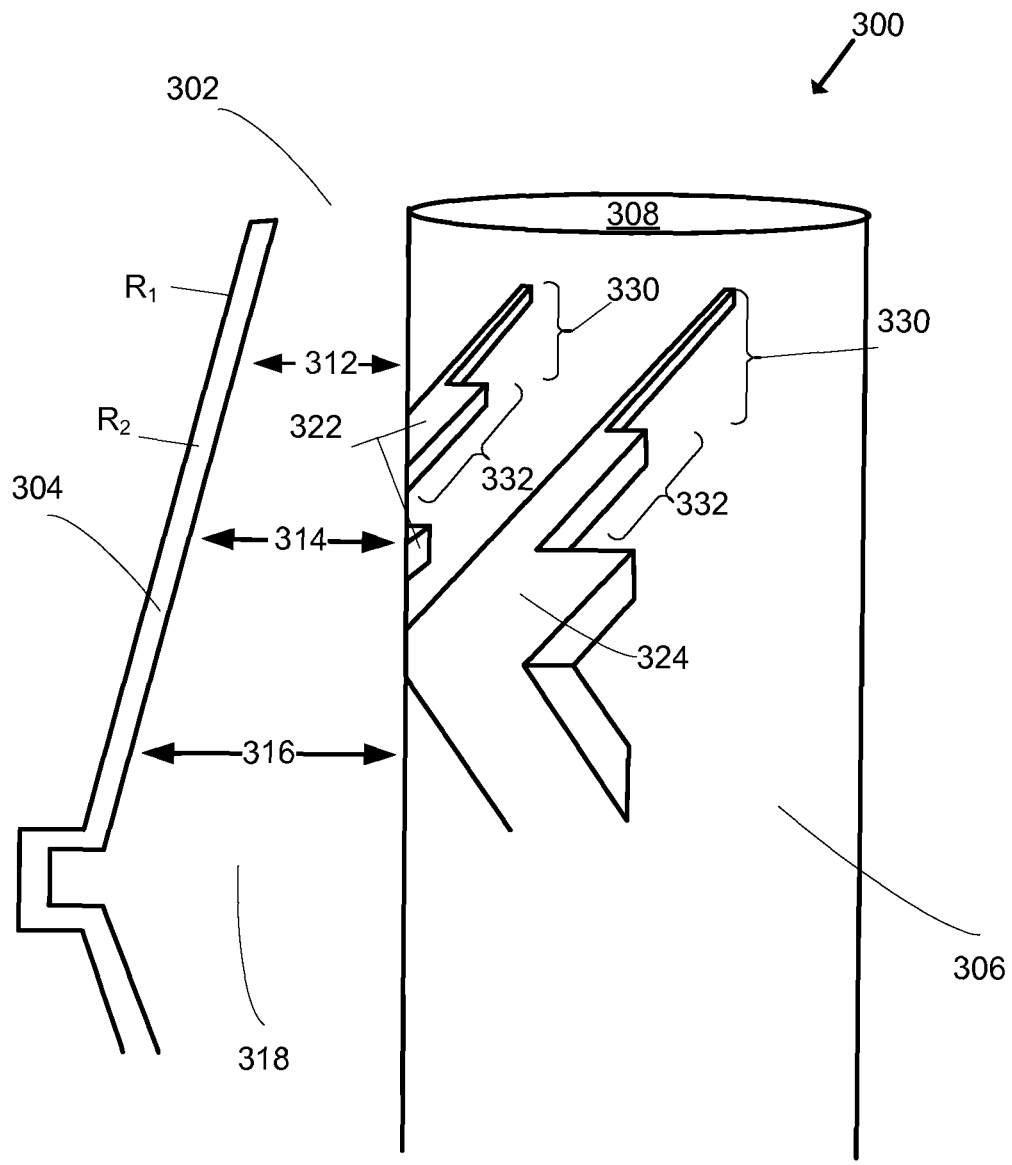
FIG. 3 illustrates variable groove profiles formed on a stationary component, according to one aspect of the present embodiments.

FIG. 3 provides an exemplary embodiment of a fluid dynamic bearing motor 300 having a rotatable component 304, a stationary component 306, and a fluid dynamic bearing 302 defined in a gap 318 between the stationary 306 and rotatable components 304, wherein the stationary 306 and rotatable components 304 are configured for relative rotation. Furthermore, a first groove 322 is defined on the stationary 306 or the rotatable components 304, wherein a predetermined width or a predetermined depth of the first groove 322 is selected based on the gap 318.

According to yet another embodiment, FIG. 3 provides a number of varying gaps formed between the stationary 306 and rotatable components 304. For example, a first gap 312 may be located between a first position $R_1$ and a second position $R_2$ And a second gap 314 between a second position $R_2$, and a third position $R_3$, wherein the first gap 312 may be narrower at the first position $R_1$ than the second gap 314 at the second position $R_2$. The narrower first gap 312 at the first position $R_1$ may have a shallower and/or narrower groove profile than a groove profile positioned at the second gap 314 in the second position $R_2$. According to an embodiment, the first position $R_1$ may be positioned proximate to a first axial end 308 and the second position $R_2$ may be positioned distal to the first axial end 308 of the stationary 306 and rotatable components 304.

For example, during a shock event (i.e., dropping or tilting) external forces may cause the system to operate ineffectively and the robustness of the bearing may be increasingly reduced. According to an embodiment, by controlling the groove depth or groove width as a function of the narrowness of the gap 318 between the rotatable component 304 and stationary component 306 the bearing may become stiffer. As a result, variable forces applied to the fluid dynamic bearing motor 300 will be compensated for by varying the groove depth or width as a function of the local radial gap wherein angular and in-line stiffness are increased to provide for a more robust bearing.

In further detail, FIG. 3 provides a number of grooves on at least one of the stationary component 306 or the rotatable component 304. The number of grooves may include the first groove 322, and a second groove 324 wherein the first and/or second, grooves (322, 324) includes a predetermined width or a predetermined depth. The predetermined width or predetermined depth is selected based on the gap 318. The first and/or second grooves (322, 324) profiles may reach a predetermined performance by varying the groove depths and/or widths as a function of the gap 318.

Moreover, the first and second groove (322, 324) profiles may have a first portion 330 that corresponds to the first gap 312 and a second portion 332 that corresponds to the second gap 314, wherein the first and second portions 330, 332 include a predetermined groove depth or a predetermined groove width based on the gap 318 between the stationary component 306 and the rotatable component 304. In other words, the first groove portion 330 may correspond to a shallower groove depth or a narrower groove width whereas the second groove portion 332 may correspond to a deeper groove depth or a wider groove width based on the gap 318.

Therefore, the first groove portion 330 of the first groove 322 may be configured to produce a first stiffness in the first gap 312 that is different from the second groove portion 332 of the first groove 322 that is configured to produce a second stiffness in the second gap 314. Furthermore, the first groove portion 330 of the second groove 324 may be configured to produce a third stiffness in the first gap 312 that is different from the second groove portion 332 of the second groove 324 that is configured to produce a fourth stiffness in the second gap 314. For example, the first groove 322 may be configured to have a shallower depth or a narrower width at the first position $R_1$, (e.g., which is illustrated by the first portion 330 of the first groove 322), and the second groove 324 may be configured to have a deeper depth or a wider width at the second position $R_2$, (e.g., which is illustrated by the second portion 332 of the second groove 324)

Therefore, varying the groove profiles allows for tuning the stiffness based on both a tighter gap and a wider gap, thereby allowing tuning of in-line and angular stiffness relative to the gap 318. For example, stiffness may be tuned for a tighter gap design in the fluid dynamic bearing motor 300 in response to external forces causing the gap 318 to close down or narrow.

In various embodiments, the rotatable component 304 may be an inner component and the stationary component 306 may be an outer component. According to some embodiments, the stationary component 306 may be paired with the rotatable component 304 by binning and/or 1-to-1 matching. Therefore, a more effective and controlled gap and groove profiles may be established to ensure a more stable system wherein robustness of the bearing is maintained during a shock event or a steady state event.

Figure 4:
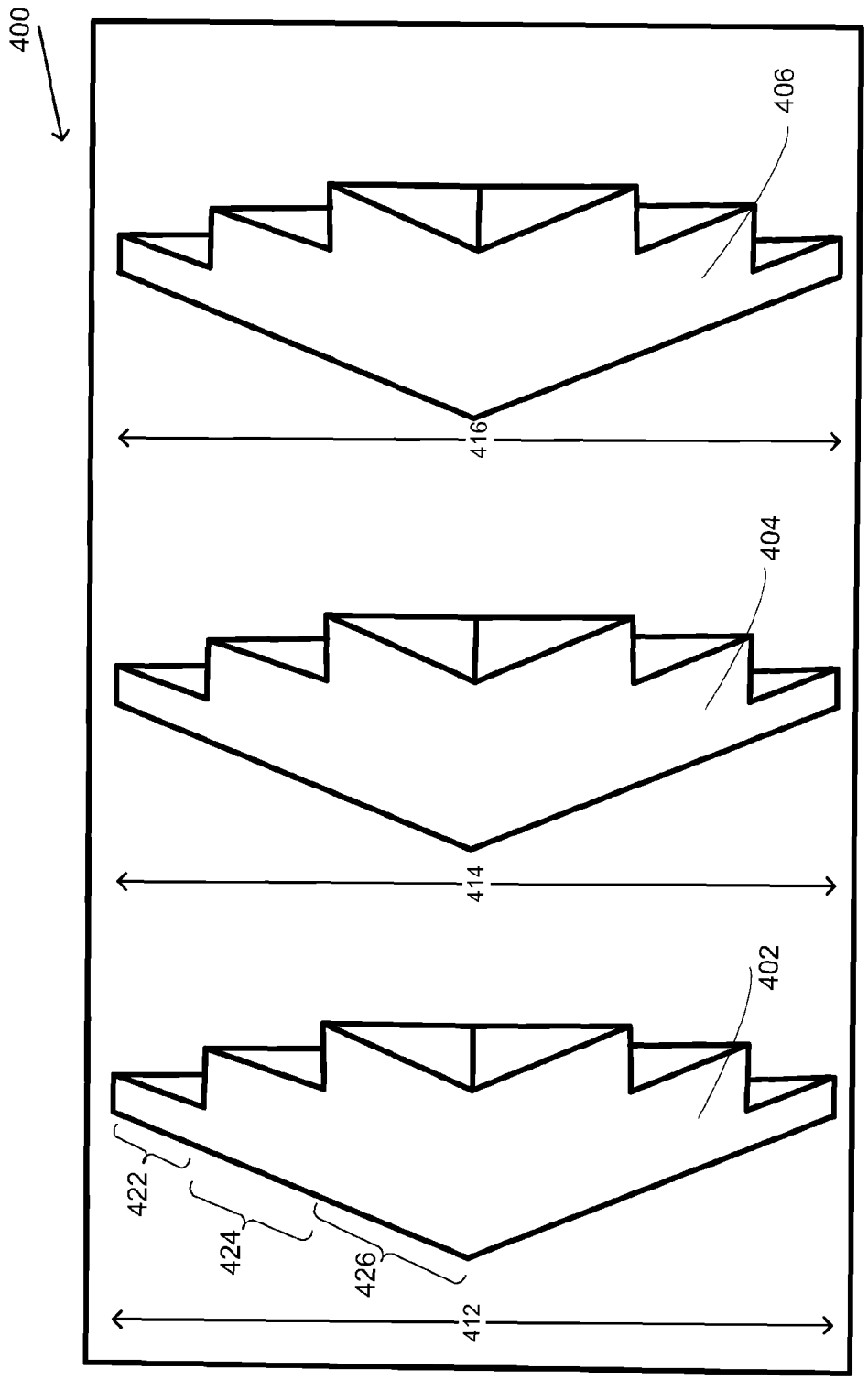
FIG. 4 illustrates an un-rolled 3-D view of a sleeve and/or shaft groove, according to one aspect of the present embodiments.

FIG. 4 provides an un-rolled view 400 of a journal bearing formed on a sleeve and/or shaft 410 wherein varying groove profiles are provided according to an embodiment. For example, the varying groove profiles may include a first groove 402 having a first predetermined first length 412, a second groove 404 having a second predetermined length 414, and a third groove 406 having a third predetermined length 416. According to another embodiment, the first, second, and third predetermined lengths 412, 414, 416 may be the same lengths or varying lengths. The first groove 402, may include multiple portions that exhibit different groove characteristics (e.g., height/width) depending up narrowness or wideness of the gap position that corresponds to the portions position. In other words, as a gap narrows between a stationary component and a rotatable component the corresponding groove portion of the first groove 402 may become narrower and shallower at the smaller gaps and wider and deeper at the larger gaps. For example, a first portion 422 may have a narrower width and/or a shallower depth than a second portion 424 of the first groove 402 and the second portion 424 may have a narrower width and/or a shallower depth than a third portion 426 of the first groove 402. The first, second, and/or third groove portions 422, 424, 426, (e.g., groove depth and/or the groove width) of the first groove 402 are selected based on the first, second, and/or third gaps (312, 314, 316, See FIG. 3). According to some embodiments, a groove width may be optimized wherein the width between each groove may be approximately 50% of the pitch from groove to groove and the groove depth is between 1.5 to 2 times as deep.

For example, the first groove portion 422 is positioned at a first position wherein the first position corresponds to a narrow gap. The second groove portion 424 is positioned at a second position wherein the second position has a wider gap than the first position. The third groove portion 426 is positioned at a third position wherein the third position has a wider gap than both the first and second positions. Therefore, the first groove portion 422 may be configured to produce a first stiffness that is greater at the first position than the second groove portion 424 that is configured to produce a second stiffness at the second position. Furthermore, the second groove portion 424 may be configured to produce the second stiffness that is greater at the second position than the third groove portion 426 that is configured to produce a third stiffness at a third position. According to an embodiment, other grooves (e.g., the second and/or third grooves 404, 406) may share similar groove profiles as illustrated in the first groove 402 and/or varying groove profiles. Accordingly, by varying the groove depths and/or widths at different positions within the journal bearing stiffness may be tuned, thereby providing a more controlled environment during both external shock events and steady states.

Figure 5:
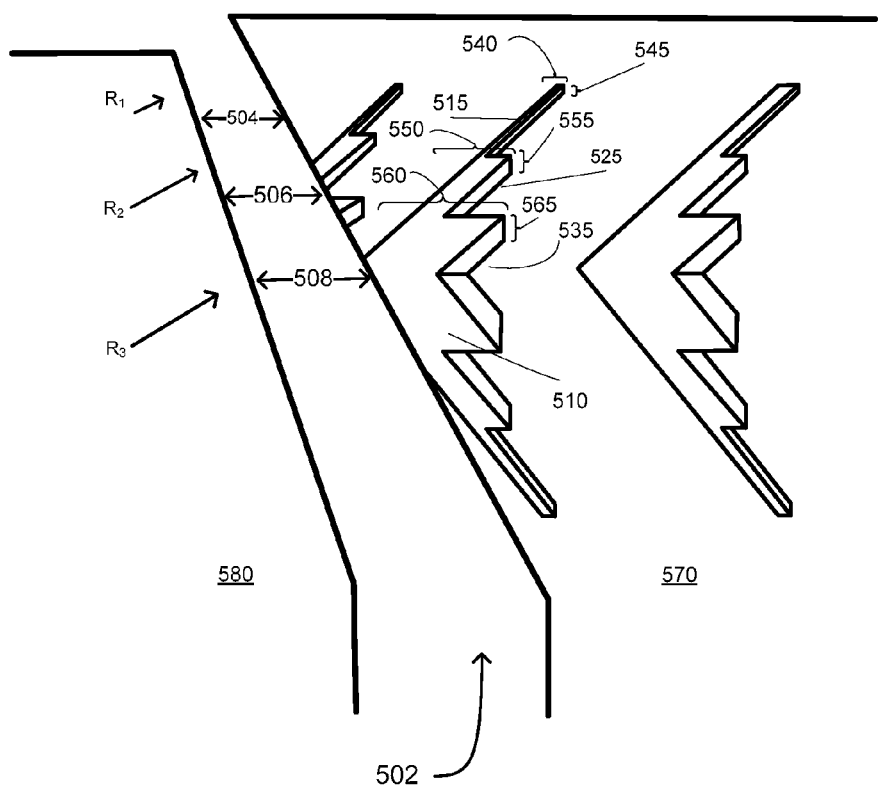
FIG. 5 illustrates a conical bearing, according to one aspect of the present embodiments.

According to another embodiment, as illustrated in FIG. 5, the fluid dynamic bearing 502 may comprise a conical bearing. A first gap 504, a second gap 506, and a third gap 508 may vary in width between a first position $R_1$, a second position $R_2$, and a third position $R_3$. A first groove 510 may include a first groove portion 515 at the first gap 504 is configured to produce a first stiffness that is greater than a second stiffness produced by a second groove portion 525 at the second gap 506 and a third stiffness produced by a third groove portion 535 at the third gap 508. Angular stiffness of the conical bearing herein may be defined by $1/r^4 \times \Delta P/\Delta S$ of the pump, wherein $\Delta P$ represents changes in pressure and $\Delta S$ represents changes in radial as well as axial direction.

The first groove portion 515 includes a first predetermined width 540 and/or a first predetermined depth 545. The second groove portion 525 includes a second predetermined width 550 and/or a second predetermined depth 555. The third groove portion 535 includes a third predetermined width 560 or a third predetermined depth 565. In various embodiments, the first groove portion 515, the second groove portion 525, or the third groove portion 535 is configured to increase stiffness in response to a narrowing of the first gap 504, the second gap 506, or the third gap 508 during the relative rotation of a stationary component 570 and a rotatable component 580.

Figure 6:
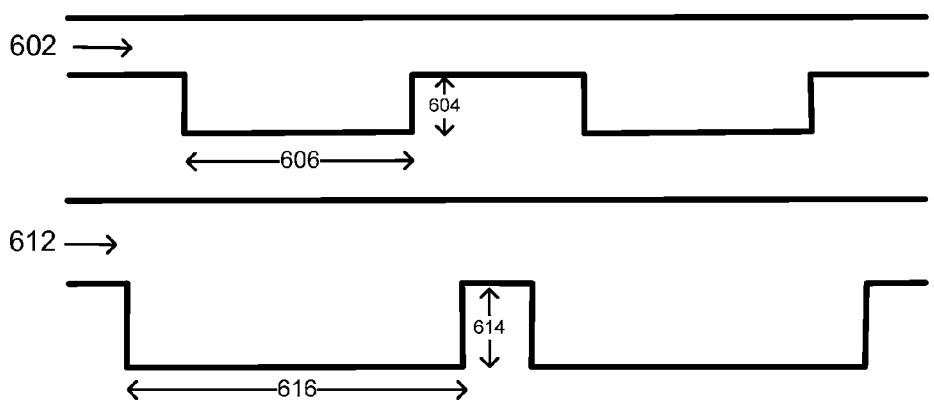
FIG. 6 illustrates groove depth profiles as a function of radial gaps, according to one aspect of the present embodiments.

FIG. 6 provides an exemplary groove depth and width profile for a groove illustrated in the aforementioned figures. The groove may have varying groove profiles based on the location of the groove profiles and the corresponding gap between a stationary component and a rotatable component. According to an embodiment, a first groove portion 602 includes a first predetermined depth 604 and/or a first predetermined width 606. A second groove portion 612 includes a second predetermined depth 614 and/or a second predetermined width 616. The first groove portion 602 corresponds to a first gap. The second groove portion 612 corresponds to a second gap, wherein the second gap is larger than the first gap. Therefore, the relationship between groove depth, groove width, and the gap between the stationary and rotatable components may be adjusted in order to affect stiffness caused by pumping oil or fluids between the stationary and rotatable components.

Figure 7A:
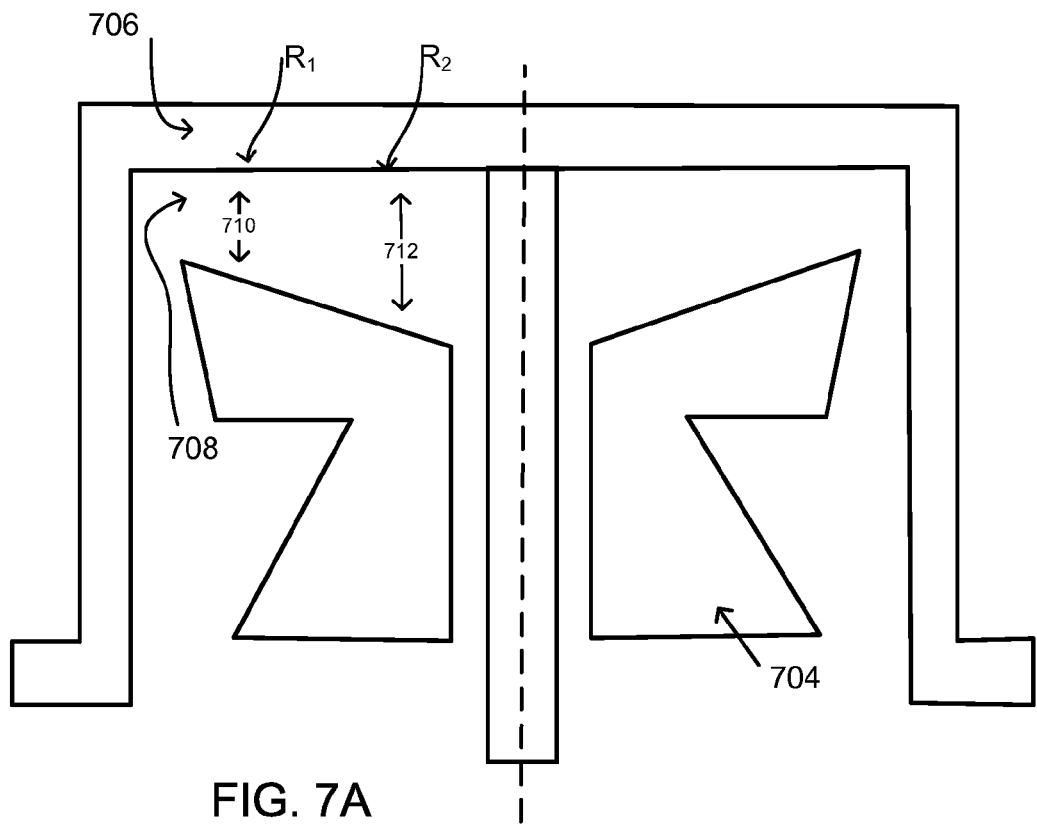
FIG. 7A illustrates a thrust bearing between the stationary and rotatable components, according to one aspect of the present embodiments.

FIG. 7A illustrates a variable gap thrust bearing 708 radially formed by a stationary component 704 and a rotatable component 706 rotating relative to one another. The thrust bearing 708 may comprise a first radial gap, 710 and a second radial gap 712, formed between the stationary component 704 and the rotatable component 706. According to an embodiment, the first radial gap 710 may be narrower at a first position $R_1$ than the second radial gap 712 at a second position $R_2$. A first angular stiffness may be selected based on the first radial gap 710, and a second angular stiffness may be selected based on the second radial gap 712. Angular stiffness of the thrust bearing herein may be defined by $1/r^4 \times \Delta P/\Delta R$ of the pump, wherein $\Delta P$ represents changes in pressure and $\Delta R$ represents changes in radial direction.

Figure 7B:
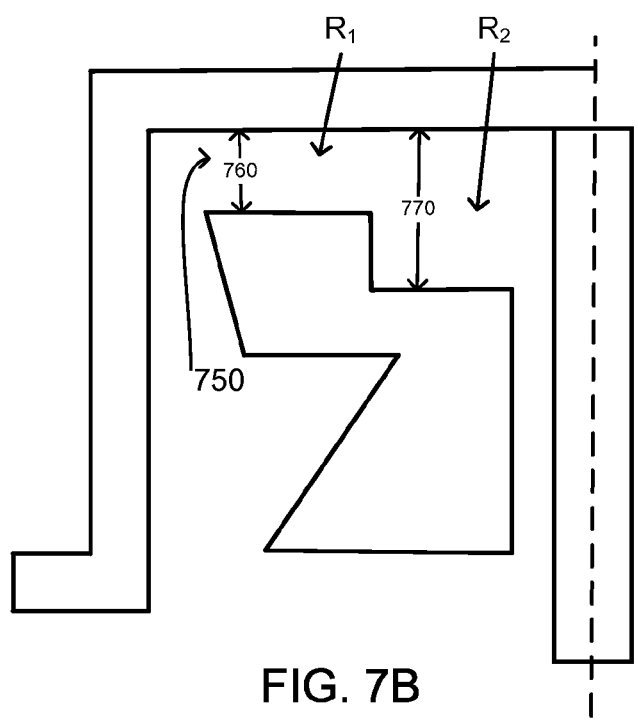
FIG. 7B illustrates a step thrust bearing according to one aspect of the present embodiments.

FIG. 7B illustrates a step thrust bearing formed by the rotatable component and the stationary component. In various embodiments, the thrust bearing may not be continuously variable and may instead be, for example, a dual gap thrust bearing 750. The dual gap thrust bearing 750 may include a first radial gap 760 that continues along the bearing for a length at a constant first gap $R_1$ before stepping down to a second radial gap 770 that continues along the bearing for a length at a constant second gap $R_2$. Thus, the second radial gap 770 may be wider than the first radial gap 760. According to an embodiment, the thrust bearing may further include multiple step thrust bearings and variable gaps.

Figure 8:
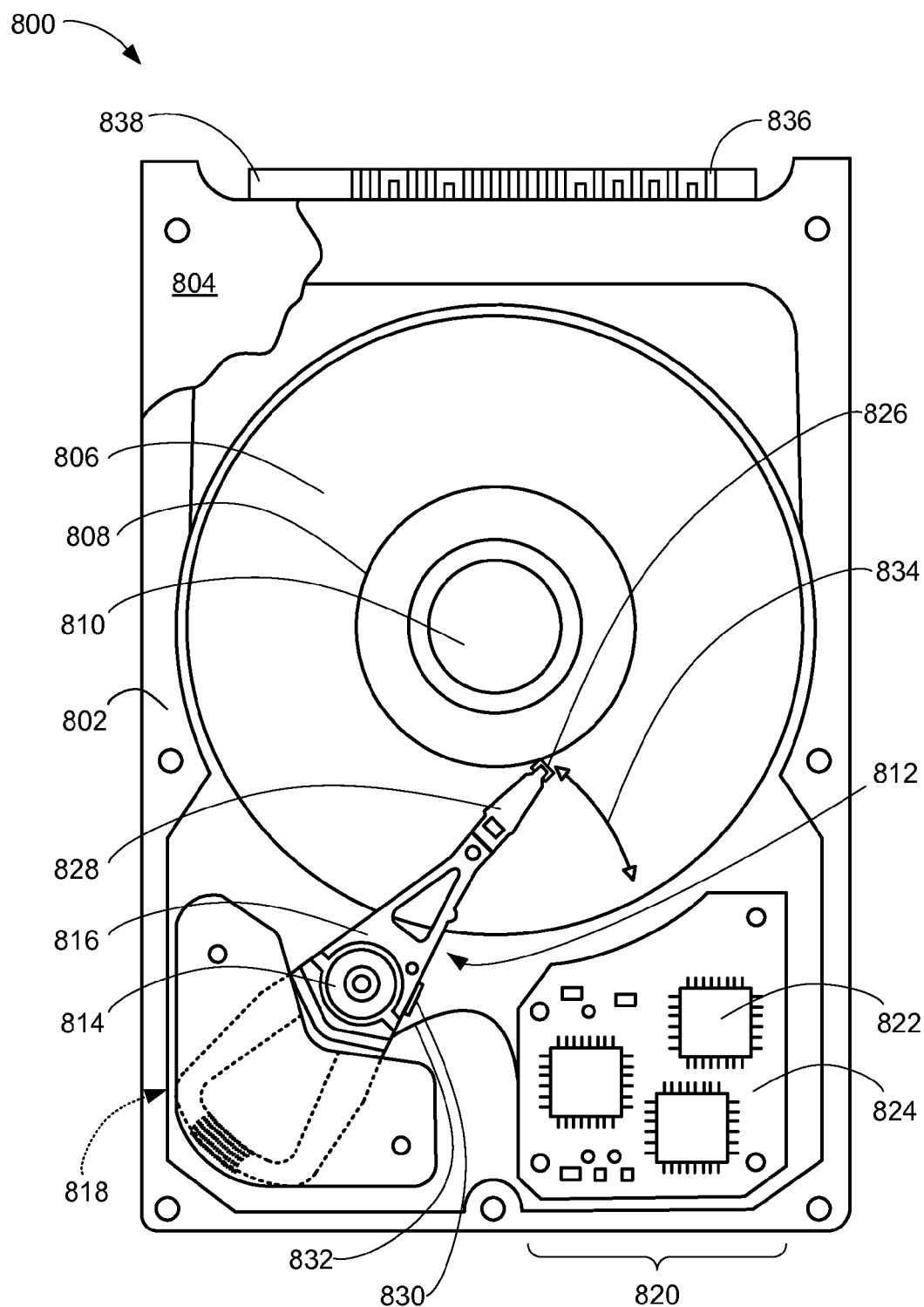
FIG. 8 illustrates a plan view of a data storage device, according to one aspect of the present embodiments.

FIG. 8 is a plan view of a data storage device in which the embodiments of fluid dynamic bearings described herein may be used. A disk drive 800 generally includes a base plate 802 and a cover 804 that may be disposed on the base plate 802 to define an enclosed housing for various disk drive components. The disk drive 800 includes one or more data storage disks 806 of computer-readable data storage media. Both of the major surfaces of each data storage disk 806 may include a number of concentrically disposed tracks for data storage purposes. Each data storage disk 806 is mounted on a hub 808, which in turn is rotatably interconnected with the base plate 802 and/or cover 804. Multiple data storage disks 806 may be mounted in vertically spaced and parallel relation on the hub 808. A spindle motor 810 rotates the data storage disks 806.

The disk drive 800 also includes an actuator arm assembly 812 that pivots about a pivot bearing 814, which in turn is rotatably supported by the base plate 802 and/or cover 804. The actuator arm assembly 812 includes one or more individual rigid actuator arms 816 that extend out from near the pivot bearing 814. Multiple actuator arms 816 are typically disposed in vertically spaced relation, with one actuator arm 816 being provided for each major data storage surface of each data storage disk 806 of the disk drive 800. Other types of actuator arm assembly configurations could be utilized as well, an example being an "E" block having one or more rigid actuator arm tips, or the like, that cantilever from a common structure. Movement of the actuator arm assembly 812 is provided by an actuator arm drive assembly, such as a voice coil motor 818 or the like. The voice coil motor 818 is a magnetic assembly that controls the operation of the actuator arm assembly 812 under the direction of control electronics 820.

The control electronics 820 may include a number of integrated circuits 822 coupled to a printed circuit board 824. The control electronics 820 may be coupled to the voice coil motor assembly 818, a slider 826, or the spindle motor 810 using interconnects that can include pins, cables, or wires (not shown).

A load beam or suspension 828 is attached to the free end of each actuator arm 816 and cantilevers therefrom. The suspension 828 may be biased generally toward its corresponding data storage disk 806 by a spring-like force. The slider 826 is disposed at or near the free end of each suspension 828. The read/write head (e.g., transducer) is appropriately mounted as a head unit (not shown) under the slider 826 and is used in disk drive read/write operations. The head unit under the slider 826 may utilize various types of read sensor technologies such as anisotropic magnetoresistive (AMR), giant magnetoresistive (GMR), tunneling magnetoresistive (TuMR), other magnetoresistive technologies, or other suitable technologies.

The head unit under the slider 826 is connected to a preamplifier 830, which is interconnected with the control electronics 820 of the disk drive 800 by a flex cable 832 that may be mounted on the actuator arm assembly 812. Signals are exchanged between the head unit and its corresponding data storage disk 806 for disk drive read/write operations. In this regard, the voice coil motor 818 is utilized to pivot the actuator arm assembly 812 to simultaneously move the slider 826 along a path 834 and across the corresponding data storage disk 806 to position the head unit at the appropriate position on the data storage disk 806 for disk drive read/write operations.

When the disk drive 800 is not in operation, the actuator arm assembly 812 is pivoted to a "parked position" to dispose each slider 826 generally at or beyond a perimeter of its corresponding data storage disk 806, but in any case in vertically spaced relation to its corresponding data storage disk 806. In this regard, the disk drive 800 includes a ramp assembly (not shown) that is disposed beyond a perimeter of the data storage disk 806 to both move the corresponding slider 826 vertically away from its corresponding data storage disk 806 and to also exert somewhat of a retaining force on the actuator arm assembly 812.

Exposed contacts 836 of a drive connector 838 along a side end of the disk drive 800 may be used to provide connectivity between circuitry of the disk drive 800 and a next level of integration such as an interposer, a circuit board, a cable connector, or an electronic assembly. The drive connector 838 may include jumpers (not shown) or switches (not shown) that may be used to configure the disk drive 800 for user specific features or configurations. The jumpers or switches may be recessed and exposed from within the drive connector 838.

Thus, as provided herein, is an apparatus, including a fluid dynamic bearing defined in a gap between a stationary component and a rotatable component, wherein the fluid dynamic bearing includes a first portion of the gap at an axial end of the fluid dynamic bearing, and second portion of the gap, and the first portion of the gap is narrower than the second portion of the gap; and a groove in the fluid dynamic bearing on the stationary component or the rotatable component, wherein the groove includes a portion of a predetermined width or a predetermined depth, and the portion of the predetermined width or predetermined depth is selected based on the first gap or the second gap.

In some embodiments, the fluid dynamic bearing is a journal bearing, a thrust bearing, a limiter bearing, or a conical bearing. In some embodiments, the gap is variable between a first position and a second position. In some embodiments, the groove is configured to produce a stiffness that is greater at the first position than at the second position. In some embodiments, the groove portion is configured to produce a first stiffness in the gap that is different from another groove portion that is configured to produce a second stiffness in the gap. In some embodiments the first portion of the gap is smaller than the second portion of the gap, and the portion of the predetermined width or predetermined depth is selected to be smaller at the first portion of the gap than at the second portion of the gap. In some embodiments, the groove portion is configured to have a shallower depth or a narrower width at a first position than at a second position. In some embodiments, the groove portion is configured to increase stiffness in response to a narrowing of the gap during said relative rotation.

Also provided herein is an apparatus, including an inner component, an outer component, wherein the inner component and outer component define a fluid dynamic bearing, a first gap and a second gap in the fluid dynamic bearing, wherein the first gap is narrower than the second gap, and a first groove portion in the first gap and a second groove portion in the second gap, wherein a width of the first groove portion is different from a width of the second groove portion, or a depth of the first groove portion is different from a depth of the second groove portion.

In some embodiments, the fluid dynamic bearing is a journal bearing, a thrust bearing, a limiter bearing, or a conical bearing. In some embodiments, the first gap and the second gap are variable between a first position and a second position. In some embodiments, the first groove portion in the first gap is configured to produce a stiffness that is greater at the first position than at the second position. In some embodiments, the first groove portion or the second groove portion comprises a variable predetermined width or a variable predetermined depth. In some embodiments, the first groove portion or the second groove portion is configured to increase stiffness in response to a narrowing of the first gap or the second gap during a relative rotation of the inner component and the outer component.

Also provided herein is an apparatus, including a fluid dynamic bearing defined by a stationary component and a rotatable component, wherein the stationary component and rotatable component are configured for relative rotation; a first groove portion in the fluid dynamic bearing, wherein a first groove portion width or a first groove portion depth is configured to produce a first predetermined stiffness in the fluid dynamic bearing, wherein the first predetermined stiffness is based on a first gap in the fluid dynamic bearing; and a second groove portion in the fluid dynamic bearing, wherein a second groove portion width or a second groove portion depth is configured to produce a second predetermined stiffness in the fluid dynamic bearing, wherein the second predetermined stiffness is based on a second gap in the fluid dynamic bearing.

In some embodiments, the fluid dynamic bearing is a journal bearing, a thrust bearing, a limiter bearing, or a conical bearing. In some embodiments, the first groove portion width is different from the second groove portion width or the first groove portion depth is different from the second groove portion depth. In some embodiments, the first gap and the second gap are variable between the first groove portion and the second groove portion. In some embodiments, the first predetermined stiffness is greater than the second predetermined stiffness. In some embodiments, the first groove portion or the second groove portion is configured to increase stiffness in response to a narrowing of the first gap or the second gap during said relative rotation.

While embodiments have been described and/or illustrated by means of examples, and while these embodiments and/or examples have been described in considerable detail, it is not the intention of the applicant(s) to restrict or in any way limit the scope of the embodiments to such detail. Additional adaptations and/or modifications of the embodiments may readily appear in light of the described embodiments, and, in its broader aspects, the embodiments may encompass these adaptations and/or modifications. Accordingly, departures may be made from the foregoing embodiments and/or examples without departing from the scope of the embodiments. The implementations described above and other implementations are within the scope of the following claims.

What is claimed is:

1. An apparatus comprising:
   a fluid dynamic bearing between a stationary shaft and a rotatable sleeve, and wherein the rotatable sleeve rotates with respect to the stationary shaft, and wherein a hub rotates with respect to the stationary shaft;
   a groove comprising a first segment and a second segment, wherein the first segment converges toward the second segment, and wherein the first segment of the groove comprises:
      a first portion of the groove in the fluid dynamic bearing formed on the stationary shaft;
      a second portion of the groove in the fluid dynamic bearing, wherein the first portion is closer to an outer diameter of the fluid dynamic bearing than the second portion, and wherein the second portion is wider and deeper than the first portion, and wherein the first portion and the second portion together are stair shaped;
   a first gap in the fluid dynamic bearing at the first portion formed between the stationary shaft and the rotatable sleeve; and
   a second gap in the fluid dynamic bearing at the second portion formed between the stationary shaft and the rotatable sleeve, wherein the first gap and the second gap are formed by a radial variation of the rotatable sleeve and the stationary shaft, wherein the second gap is greater than the first gap.

2. The apparatus in claim 1, wherein the fluid dynamic bearing is a thrust bearing and a limiter bearing.

3. The apparatus of claim 1, wherein the first portion of the groove or the second portion of the groove is configured to increase stiffness in response to a narrowing of the first gap or the second gap in response to a relative rotation of the stationary shaft and the rotatable sleeve.

4. The apparatus of claim 1, further comprising:
   a third portion of the groove in the fluid dynamic bearing, wherein the third portion is wider and deeper than the second portion.

5. The apparatus of claim 1, further comprising:
   a third gap in the fluid dynamic bearing at a third portion of the groove, wherein the third gap is greater than the second gap.

6. The apparatus of claim 1, further comprising:
   a third portion of the groove in the fluid dynamic bearing, wherein the third portion is wider and deeper than the second portion and configured to increase stiffness in response to a narrowing of a third gap during a relative rotation of the stationary shaft and the rotatable sleeve.

* * * * *